Dec. 30, 1958  W. H. STRUTHERS  2,866,497
COMPOSITE CUSHION AND METHOD OF MAKING THE SAME
Filed Feb. 1, 1957
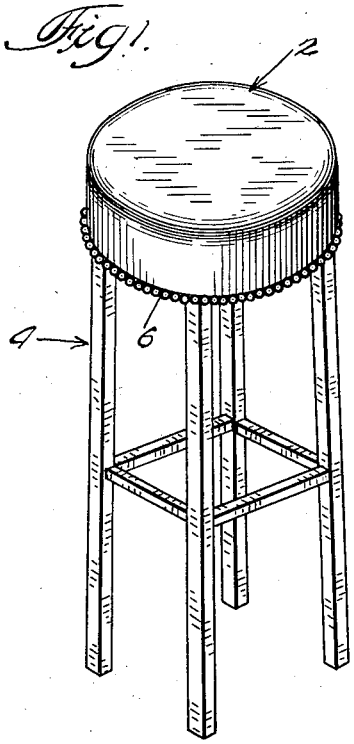
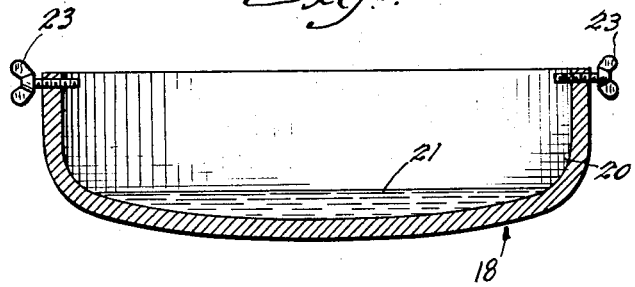
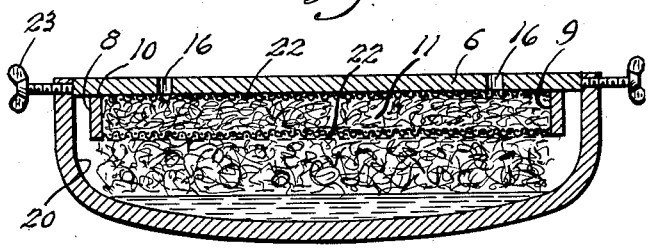
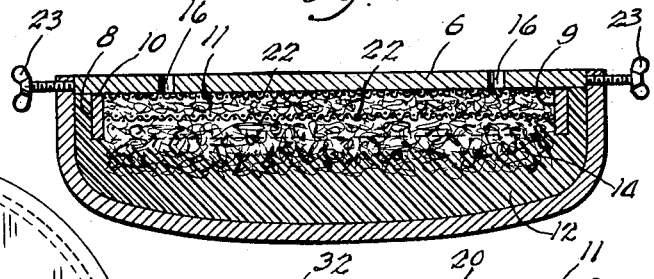
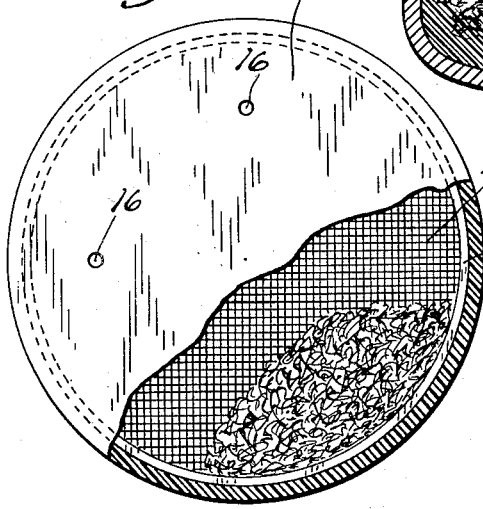
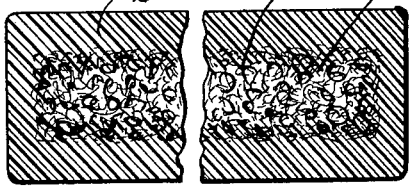
INVENTOR.
William H. Struthers.
BY B. Gordon Allen United States Patent Office 2,866,497
Patented Dec. 30, 1958

2,866,497

COMPOSITE CUSHION AND METHOD OF MAKING THE SAME

William H. Struthers, Chicago, Ill., assignor to Molded Foam Corporation, Aurora, Ill., a corporation of Illinois Application February 1, 1957, Serial No. 637,680

2 Claims. (Cl. 155—178)

This invention relates to cushions such as are commonly used for seats or mattresses, and more particularly to a novel composite seat having the characteristics of unusual resilience or memory quality for a given flexibility. Memory quality is the ability of the seat or mattress to return to its original state within short seconds after it has been depressed.

The invention also comprehends a novel process for making such cushions.

According to prior art practices, such cushions have been made of natural or synthetic rubber, sometimes impregnated with flat fibers; however, it has been found that cushions of this type are expensive to manufacture and are either too flexible or too stiff or lack the necessary memory quality necessary to a fine cushion. Moreover, cushions made of natural or synthetic rubber are relatively perishable.

Other prior art cushions have been composed of various synthetic materials in substitution for rubber; however, in every instance, cushions so composed have failed to satisfy the foregoing requirements for a fine cushion, namely, flexibility and memory quality.

It has been discovered that a mixture of polyurethane foam and curled hair treated with latex in predetermined proportions will provide a seat, mattress or cushion which may have any desired degree of resilience or flexibility, which will retain its memory qualities over long periods of time and extensive use and which can be easily and cheaply manufactured.

Polyurethane foams are produced by the reaction of a di- or polyisocyanate with an alkyd or polyether alcohol type resin in the presence of water and/or an acid. The foaming reaction may be spontaneous or may be modified or delayed by certain catalysts well known to the art. Carbon dioxide gas is generated during the course of the reaction, causing the mass to foam at the same time another reaction is causing the resinous mass to cure. When properly formulated, mixing of the ingredients results in production of an essentially cured mass in seconds.

All ingredients for conventional polyurethane foams are liquid and foams of any desired density may be produced under close control. The foam itself has the quality of adhering closely to many materials, particularly hair, coil springs and the like.

Accordingly, a primary object of the invention is to devise a novel composite cushion in which a polyurethane foam is partially impregnated with latex treated curled hair or other suitable natural or synthetic fibres to produce a seat, mattress or cushion having any desired degree of softness and flexibility and which would still retain the desired memory quality.

Another object of the invention is to produce a cushion such as above described, having an uninterrupted smooth cushioning surface.

A more specific object of the invention is to partially impregnate a polyurethane foam with curled hair in such manner that the composite structure affords softness and flexibility to the cushion and the combined foam and fibres impart memory quality thereto.

The invention comprehends embodiments in which all or part of the fibres in a cushion are imbedded in the foam, and also comprehends an embodiment in which fibres are imbedded in the foam and are then completely surrounded by a layer of clean polyurethane foam to afford a smooth, resilient surface and to form a reversible cushion as may be desired, for example, for use as a mattress.

Another object of the invention is to devise a novel method of fabricating a cushion such as above described.

The foregoing and other objects and advantages of the invention will become apparent from a consideration of the following specification and the accompanying drawings, wherein:

Figure 1 is a perspective view of a stool having one embodiment of the novel cushion applied thereto as a seat;

Figure 2 is a partially broken bottom plan view of the seat shown in Figure 1;

Figure 3 is a sectional view of a mold used to produce the cushion of Figures 1 and 2 taken in a plan bisecting the mold with a foamable mixture poured into the bottom of the mold;

Figure 4 is a view comparable to Figure 3, with a mass of curled hair suspended in the mold by a cover to which the fibres are attached by a novel ring;

Figure 5 is a view comparable to Figure 4, showing the cushion of Figures 1 and 2 in inverted position, after the foamable mixture has foamed to fill the mold with foam which is partially impregnated by a portion of the hair; and Figure 6 is a sectional view taken in a plane bisecting a modification of the novel cushion.

Describing the invention in detail and referring first to the embodiment of Figures 1 to 5, it will be seen that the novel cushion as illustrated, generally designated 2 in Figure 1, is of round configuration such as is commonly used on a stool 4 of the type shown in this figure.

The base 6 of the cushion is formed by a round section of wood or other suitable material to which polyurethane foam will bond during the foaming process. Upstanding from the base inwardly of its outer perimeter is a flange-like member 8 which may be integral with the base or may be attached thereto in any convenient manner, as by stapling or by an adhesive at 10.

The member 8 defines an upwardly facing recess or receptacle 9 on the top of the base 6, and received within said recess is a mass of curled natural or synthetic fibres 11, such as, for example, hog's hair, but which may be produced from any organic or inorganic materials including the entire range of animal, vegetable, and mineral fibres. Curled hair, such as hog's hair, has been found to be a very effective material for this purpose and it is important that such hair or fibres be curled to afford a springing action not achieved when straight hair or fibres are used. Because curled natural hair and synthetic fibres both produce especially good results, it is to be understood that such terms as here used are deemed synonomous and are used interchangeably.

The curled hair 11 is preferably pressed into the receptacle 9 in a friction fit with the inner perimeter of the member 8; however, if desired, the bottom layer of hair may be additionally secured to the base as by an adhesive.

The hair within the receptacle 9 is disposed within an air pocket therein and does not contact the polyurethane foam which is partially impregnated by the hair above the receptacle. Thus the foam comprises an outer layer 12 which is free from hair and is bonded during the foaming action to the base 6 and to the member 8.

The foam also comprises an inner layer 14 impregnated by the hair above the air pocket to form a layer of mixed foam and hair which, because of its springy action, imparts to the combination excellent memory quality, and the mixture is covered by the layer 12 which is unusually soft and flexible and forms a smooth outer surface as hereinafter described.

Because polyurethane can be mixed batchwise for foaming in place applications and formulated to produce varying degrees of foam density, the novel seat or mattress produced in accordance with this invention may be made soft or hard as desired. Being thermosetting, such seats or mattresses will withstand moderately high temperatures without collapse and are essentially unaffected by solvents, particularly dry cleaning solvents. In the novel cushion heretofore described, the density of the foam excluding the hair is preferably of at least the order of three (3) pounds per cubic foot.

The air pocket in the receptacle 9 may, if desired, be eliminated by completely filling the receptacle 9 with foam; however, it has been found in the making of seat cushions that the air pocket and the hair mass therein contribute to the resiliency and comfort of the cushion. Preferably, the air pocket is vented by one or more ports or vents 16 which also serve a useful function in the production of the novel cushion as hereinafter described.

Referring now to Figure 3 which shows an open top mold 18, the inner surface of which is preferably coated with a layer 20 of material such as wax or silicone to afford the heretofore mentioned smoothed outer surface or skin of the cushion, the mold is first poured with a foamable mixture 21 such as above described. The poured mold is shown in Figure 3. The components and/or the physical conditions under which the process is carried out are regulated to delay the foaming reaction for a few seconds in order to complete successive steps before foaming begins.

Either before or after the mixture has been inserted or poured from a conventional mixing head into the mold, the hair 11 is packed into the ringlike member 8, and the latter is attached to the base 6 which functions as a mold cover during the novel process of forming the cushion.

The cover 6 is then clamped within the top of the mold as by clamps or thumbscrews 23 and is then pushed along a conveyer, during which time the delayed foaming reaction takes place to form the novel cushion heretofore described. Carbon dioxide released during this reaction escapes from the vents 16.

The foaming action is exothermic and causes a temperature and pressure increase sufficient to complete the curing of the polyester component and the thermosetting of the foam. However after the foaming action is complete, the mold may be passed through a moderately heated oven to accelerate the thermosetting and curing.

It may be noted that if desired, the mass of hair may be attached to one or more segments 22 of netting so that the fibres are formed into a matting which may be easily handled.

Referring now to Figure 6, it will be seen that a modification of the invention is disclosed wherein a mattress or similar cushion is formed by a continuous mass of polyurethane foam, an outer layer 20 of which is clean foam and completely surrounds an inner layer 32 of foam wherein there is imbedded the curled hair 11 in the manner heretofore described. Such a mattress or cushion is produced in a closed cold mold, all sides of which are treated with wax or a silicone to afford a smooth, even and silky skin to the entire finished product. The curled hair 11 is suspended in the mold by nails, adhesive or in any other suitable manner and the desired quantity of foamable mixture is introduced into the mold before or after the curled hair is anchored therein.

The composite mass of curled hair and foam designated as 14 herein may be produced by an alternative method without the use of a mold, which has been found to permit even greater control of the resiliency and memory properties of the finished seat or mattress. In such method, the mixed foam and hair is processed as follows: a mat of latex treated curled hair of any desired thickness is impregnated by rolling or spraying with a predetermined amount of a foamable mixture of isocyanate resin. The mixture is permitted to foam and set, forming cells between the hair and enrobing each curled hair with an envelope or sheath of plastic. Each curled hair thus takes on the characteristics of an elliptic spring of great strength and being interconnected with the other coated curled hairs in the mat, the entire structure forms a mass of enduring plastic springs having permanent resiliency and memory quality. The amount of resiliency may, of course, be controlled by the amount of foamable resin with which the hair is impregnated. The finished composite mass of hair and foam may then be enveloped in clean polyurethane foam as hereinbefore described to form a finished mattress or seat or may be otherwise used as desired.

Because of the density of the foam may be easily regulated and the amount of curled hair to be used determined in advance, a mattress or cushion may be produced quickly and cheaply, having any desired degree of rigidity or flexibility, but always having the characteristic memory quality heretofore unknown in the art.

While the present invention has been explained and described with reference to specific embodiments of structure, it will be understood, nevertheless, that numerous modifications and variations are susceptible of being incorporated without departure from the essential spirit or scope thereof. Accordingly, it is not intended for an understanding of this invention to be limited by the foregoing description nor by the illustrations in the annexed drawings, except as indicated in the hereinafter appended claims.

What is claimed as new and desired to be secured by Letters Patent of the United States is as follows:

1. A cushion comprising a perforated base, a flange upstanding from the base and defining a receptacle inwardly of the outer perimeter of the base, a mass of curled hair in said receptacle, and a mass of polyurethane foam having an inner layer impregnated by a portion of said mass, said foam having an outer layer confining the outer perimeter of said flange and confining the outer side of the inner layer, said outer layer being free from impregnation by said hair.

2. A cushion comprising a base, a member upstanding from said base inwardly of its inner perimeter and defining an upwardly facing recess, a mass of curled hair in said recess, polyurethane foam surrounding the outer preimeter of said member and contacting the base, a portion of said foam inwardly of its outer surface being impregnated by said hair.

References Cited in the file of this patent

UNITED STATES PATENTS

| | | |
|---|---|---|
| 2,198,724 | Schreiner | Apr. 30, 1940 |
| 2,290,614 | Rathbun | July 21, 1942 |
| 2,304,717 | Swart | Dec. 8, 1942 |
| 2,785,739 | McGregor et al. | Mar. 19, 1957 |
| 2,788,061 | Pedrocchi | Apr. 9, 1957 |